April 9, 1968  W. N. STEWART  3,377,037
AIRCRAFT EMERGENCY EJECTION ARRANGEMENT
Filed Oct. 5, 1966  3 Sheets-Sheet 1

INVENTOR.
WALTER N. STEWART
BY Harry M. Saragovitz,
Edward J. Kelly, Herbert Berl
& S. Dubroff  ATTORNEYS:

April 9, 1968

W. N. STEWART 3,377,037

AIRCRAFT EMERGENCY EJECTION ARRANGEMENT

Filed Oct. 5, 1966

INVENTOR.
WALTER N. STEWART

April 9, 1968  W. N. STEWART  3,377,037
AIRCRAFT EMERGENCY EJECTION ARRANGEMENT
Filed Oct. 5, 1966  3 Sheets-Sheet 3

INVENTOR.
WALTER N. STEWART

3,377,037
AIRCRAFT EMERGENCY EJECTION ARRANGEMENT

Walter N. Stewart, Willingboro, N.J., assignor of one-half to Edward P. Remington, Monroeville, N.J.
Filed Oct. 5, 1966, Ser. No. 584,615
5 Claims. (Cl. 244—17.15)

The invention described herein may be manufactured and used by the Government for governmental purposes without the payment to me of any royalty thereon.

This invention relates to aircraft ejection arrangements and, more particularly, to emergency ejection means for occupants of rotor sustained aircraft.

As emphasized in the U.S. Patent No. 3,222,015 to Larse et al. upward and/or downward ejection of occupants in a rotor sustained aircraft are completely untenable due to the dangerous presence of the overhead rotor or the unsafe low level would not enable safe parachute deployment. The sideward ejection of a seat occupant mass also has some objectionable features. The adverse physiological forces upon the laterally ejected seat occupant are extremly excessive and there is also the possible danger of contact with wings, engine nacelles or other fuselage protrusions.

It is an object of the invention to provide an emergency ejection arrangement for a rotor sustained aircraft by which the occupants thereof are subjected to the minimum of injurious hazards.

Another object of the invention is to provide such an arrangement in which the occupant mass is afforded the maximum of stabilization during its ejected flight.

These and other objects, features and advantages will become more apparent from the following description and accompanying drawings in which.

Figure 2:
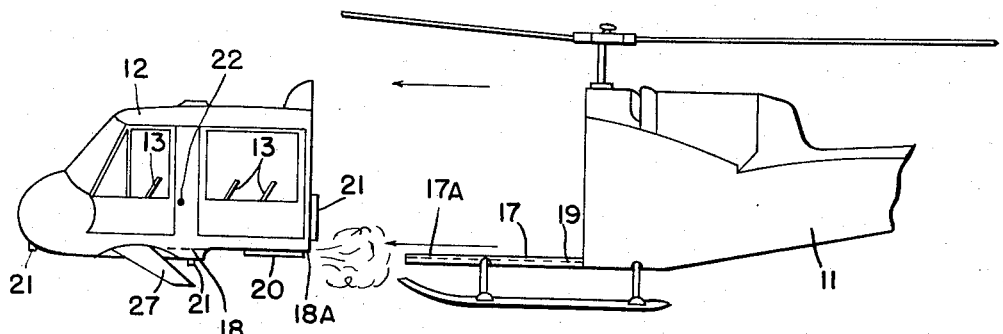
FIG. 2 is a view similar to FIG. 1 during a catapult phase of emergency ejection.
Figure 3:
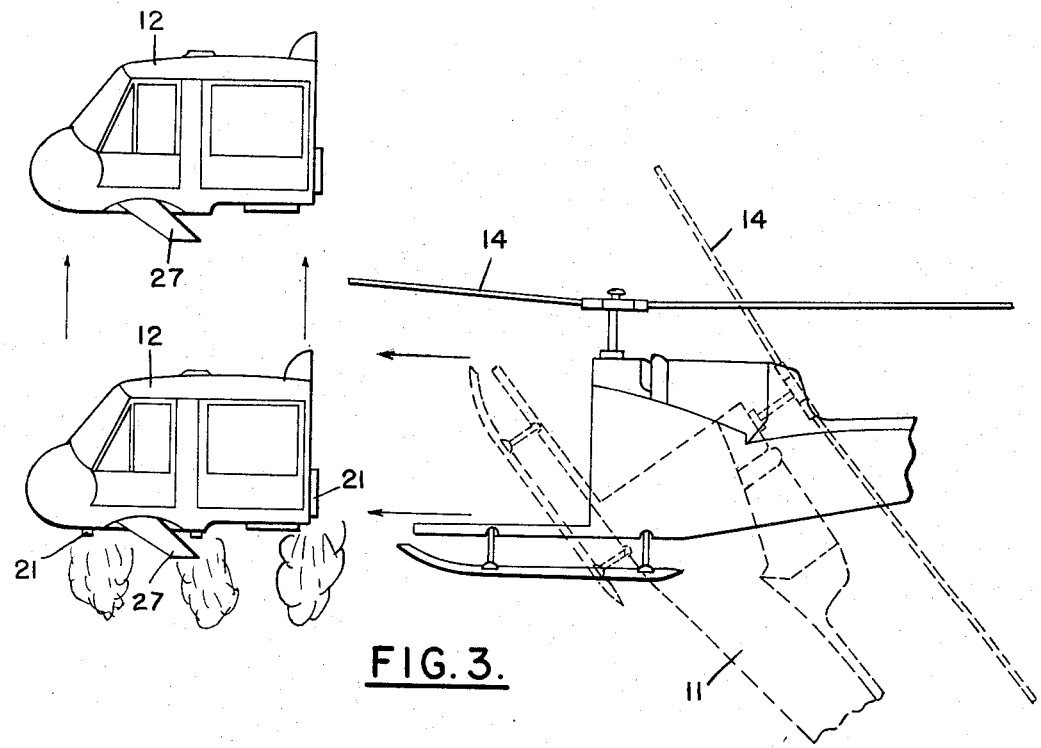
FIG. 3 is a subsequent sequential view of the FIG. 2 arrangement during a lift rocket phase of the emergency ejection.

The helicopter, shown generally at 10 (FIG. 1) has a main fuselage portion 11 and a forward cabin or cockpit portion 12 containing appropriate pilot controlling media (not shown) for operating or maneuvering the craft and seat structures 13 for accommodating crew members or other occupants. The overhead rotor blade arrangement 14 is connected by rotor shaft 15 to appropriate drive means (not shown) that may be located in the fuselage portion 11. Suitable horizontal track means 17 (FIG. 2), preferably a plurality of laterally spaced tracks extend longitudinally forward of the fuselage 11, the upper track surface means suitably supporting a mating undersurface track means 18 on the rearward portion of the cabin. Appropriate clearance or recessed surface means 19 in co-axial alignment with longitudinally extending catapult means 20 enable forward relative cabin structure movement upon the catapult actuation phase of the emergency ejecting operation. Preferably, catapult means 20 is normally positioned in a central longitudinal plane equidistant from the laterally spaced tracks 17, though plural catapults can be arranged to provide a balanced driving means about the central plane. The departing edges 17A, 18A of the track means provide the cabin 12 with maximum launch stability, and as the cabin portion 12 is catapulted forward clear of the fuselage structure, the rapid rearward displacement of the craft's center of gravity will result in a craft rearward pitch toward the phantom craft position shown in FIG. 3. This will facilitate early cabin clearance of the rotating blades 14 and enable early functioning of downwardly discharging lift rocket means 21 preferably providing upward thrust through a predetermined cabin center of gravity 22.

Figure 5:
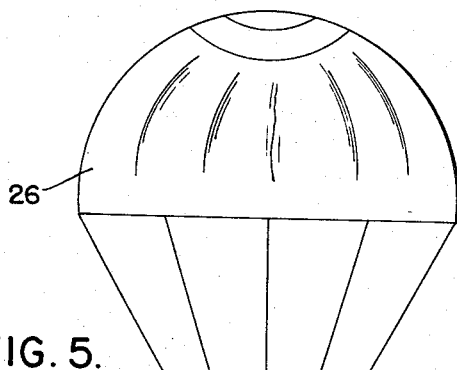
FIGS. 4 and 5 are similar views showing deployment of a parachute arrangement actuated by a drogue or pilot chute of an ejected and elevated cabin.
Figure 4:
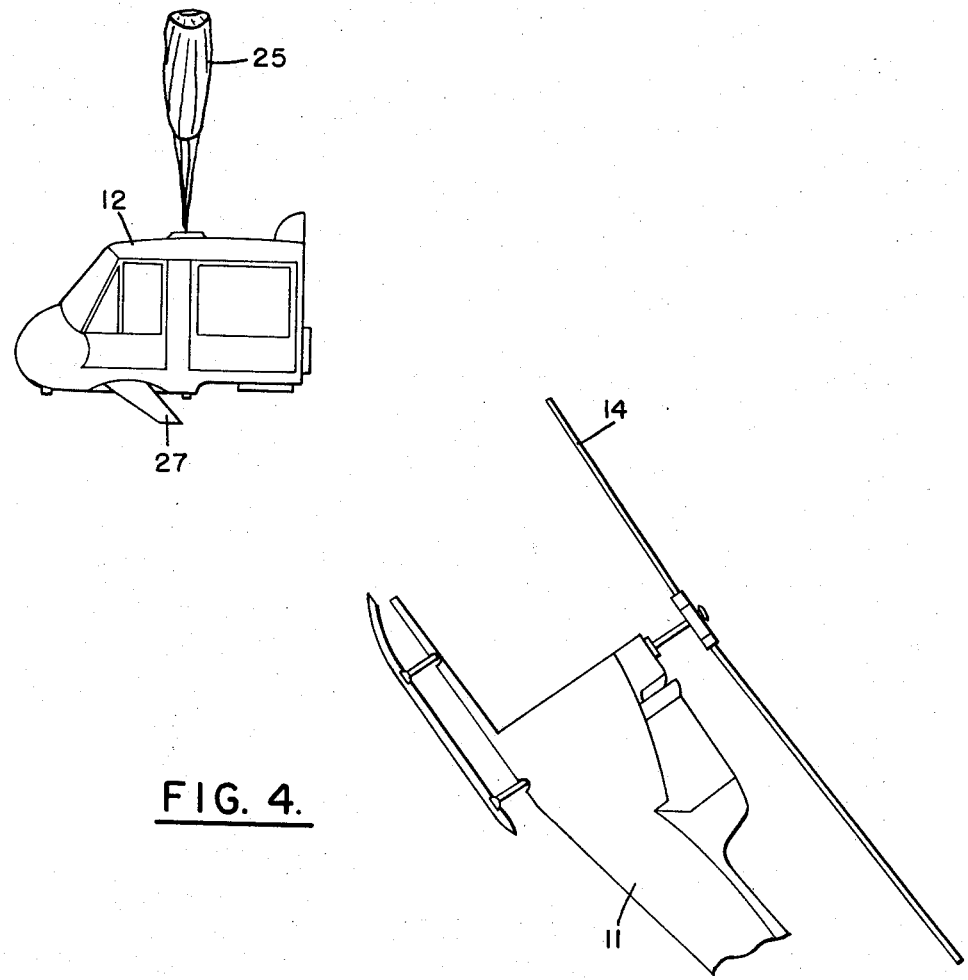

A plurality of longitudinally spaced lift rockets 21 are provided on the cabin 12, and it is contemplated that predeterminedly selected initiation of one or more rockets will produce a satisfactory cabin upward thrust or lift to an elevation enabling safe parachute deployment. The upper portion of cabin 12 carries a drogue or pilot chute 25 shown actuated in FIG. 4 at an aforementioned elevation at which the subsequently opened main parachute 26 (FIG. 5) can safely descend or return the cabin portion 12 and its contents including the occupant seat structures 13 to a suitable ground level.

The ejectable cabin portion 12 has a pair of laterally movable, opposed stabilizer fins 27 (FIGS. 2, 3, 4, 5) that are moved outwardly via an appropriate timing arrangement to supply the cabin with maximum stability during its ejected flight.

Appropriate initiation of means (not shown) for severing all necessary cable and control connections ready the disabled craft for the subsequent automatically functioning forward catapult and lift rocket time delayed phases of the emergency ejection operation.

Figure 1:
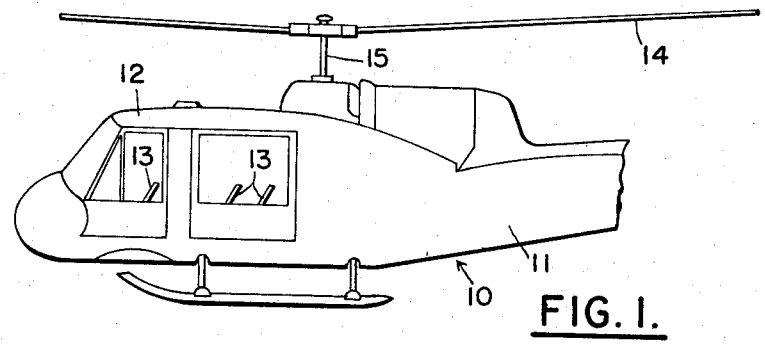
FIG. 1 is an elevational view partially broken away of a preferred rotor sustained aircraft embodying the principles of the invention.
Figure 6:
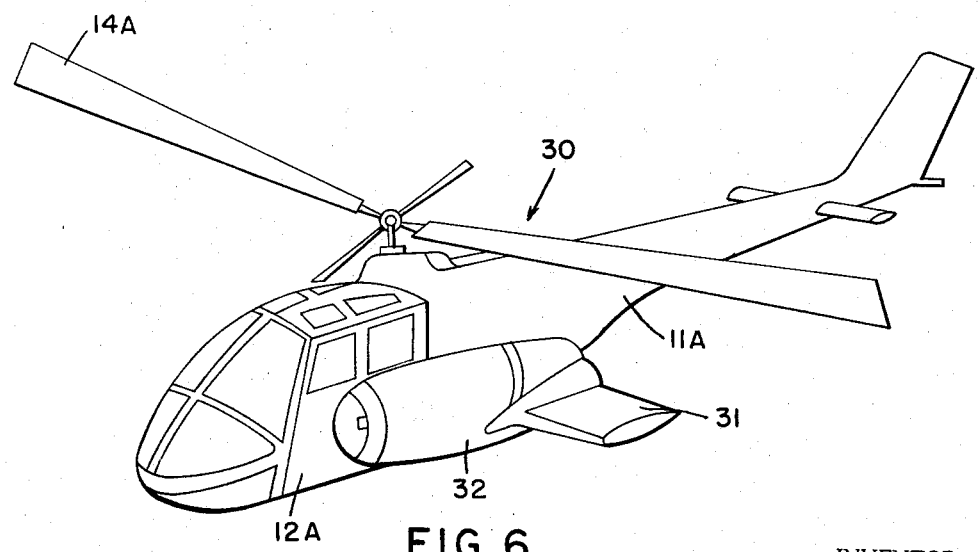
FIG. 6 is a modified view similar to FIG. 1 showing a compound helicopter embodying the principles of the invention.

The compound helicopter shown generally at 30 (FIG. 6) includes a laterally disposed wing 31 supporting an engine nacelles 32, as well as similar forward catapult and rocket elevating apparatus of the FIG. 1 craft to phasingly eject the forward cabin portion 12A clear of the fuselage 11A, rotor 14A, and the laterally protruding wing 31 and engine 32 structures.

Various modifications, changes or alterations may be resorted to without departing from the scope of the invention as defined in the appended claims.

I claim:
1. In a rotor sustained aircraft having a forward cabin portion normally secured to a main fuselage portion, and rotor means overlying said cabin and fuselage portions,
   horizontal track means extending longitudinally of said fuselage,
   said cabin portion containing seat means for accommodating occupants,
   means on said cabin portion for catapulting said cabin portion forwardly along said track means to eject the cabin portion clear of said fuselage portion and rotor means,
   means including at least one downwardly discharging lift rocket for elevating said cabin after it has been catapulted clear of said rotor and fuselage, and
   parachute means on said cabin portion for safely en- abling said cabin portion and occupants thereof to descend to a ground level.

2. The arrangement of claim 1 wherein said horizontal track means includes a pair of laterally spaced track members, and said catapult means is positioned between said track members in a central longitudinal plane.

3. The arrangement of claim 1 in which said cabin portion has laterally movable, opposed stabilizer fins that afford stability to the ejected cabin portion.

4. The structure of claim 1 wherein said elevating means is located at substantially the mid-length of the cabin portion.

5. The structure of claim 1 in which said elevating means includes a plurality of longitudinally spaced lift rockets.

References Cited

UNITED STATES PATENTS 3,222,015  12/1965  Larsen et al. ____ 244—17.15 XR
3,352,513  11/1967  Baker et al. _____ 244—17.15

FOREIGN PATENTS 702,148  1/1954  Great Britain.

MILTON BUCHLER, *Primary Examiner.*

P. E. SAUBERER, *Assistant Examiner.*